United States Patent [19]

Takami et al.

[11] Patent Number: 5,795,840
[45] Date of Patent: Aug. 18, 1998

US005795840A

[54] BURNED GAS PURIFYING CATALYST

[75] Inventors: Akihide Takami; Hideharu Iwakuni; Makoto Kyogoku; Hiroshi Murakami, all of Hiroshima, Japan

[73] Assignee: Mazda Motor Corporation, Hiroshima, Japan

[21] Appl. No.: 638,751

[22] Filed: Apr. 29, 1996

[30] Foreign Application Priority Data

Apr. 28, 1995 [JP] Japan ............................. 7-104498
Mar. 29, 1996 [JP] Japan ............................. 8-112911

[51] Int. Cl.$^6$ ........................ B01J 23/44; B01J 23/40; B01J 21/00; B01D 50/00
[52] U.S. Cl. ........................ 502/327; 502/334; 502/304; 502/439; 502/327; 502/339; 422/180
[58] Field of Search ........................ 502/334, 304, 502/439, 327, 339; 422/180

[56] References Cited

U.S. PATENT DOCUMENTS 5,332,554  7/1994  Yasaki et al. ............................. 422/180

FOREIGN PATENT DOCUMENTS 6190282  7/1994  Japan.

Primary Examiner—Glenn Caldarola
Assistant Examiner—Tanaga Boozer

[57] ABSTRACT

An exhaust gas emission control catalyst includes an under catalyst layer containing catalyst particles of platinum and rhodium and a crystalline metal silicate support for supporting the catalyst particles and an over catalyst layer, coated on the under catalyst layer, containing catalyst particles of palladium.

20 Claims, 11 Drawing Sheets

FIG. 1

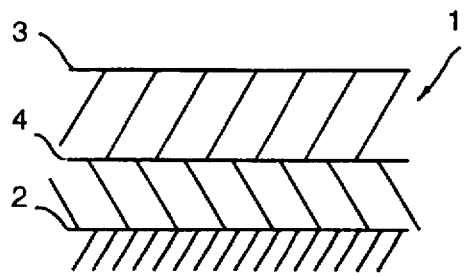

FIG. 2

|  | DESIGN SPECIFICATIONS | | | |
|---|---|---|---|---|
|  | COVER CATALYST LAYER | | UNDER CATALYST LAYER | |
|  | MATERIAL | W/C | MATERIAL | W/C |
| Ex.I | Pt,Rh(1.6g/L)/H-Z | 30% | Pd(6g/L)/Alumina | 15% |
| Ex.II | [Pt,Rh(1.6g/L)/H-Z]+Ceria | 30% | Pd(6g/L)/Alumina | 15% |
| Ex.III | [Pt,Rh(1.1g/L)/H-Z]+Ceria | 30% | Pd(6g/L)/Alumina | 15% |
| Ex.IV | Pt,Rh(1.6g/L)/H-Z | 15% | Pd(6g/L)/Alumina | 30% |
| Ex.V | Pt,Rh(1.6g/L)/(H-Z+Ceria) | 30% | Pd(6g/L)/H-Z | 15% |
| Ex.VI | Pt,Rh(1.6g/L)/H-Z | 30% | Pd(6.9g/L),La/Alumina | 15% |
| Ex.VII | Pt,Rh(1.6g/L)/H-Z | 30% | Pd(6.9g/L),La,Ba/Alumina | 15% |
| Ex.VIII | Pt,Rh(1.6g/L)/(H-Z+Alumina) | 30% | Pd(6.9g/L)/Alumina | 15% |
| Ex.IX | Pt,Rh(1.6g/L)/(H-Z+Ceria) | 30% | Pd(6.9g/L),La,Ba/(Alumina + Ceria) | 15% |
| Tsam.I | Pd/Alumina | 30% | — | 15% |
| Tsam.II | Pt,Rh/Alumina | 30% | — | 15% |
| Tsam.III | Pt,Rh/Alumina | 30% | Pd(6g/L)/H-Z | 15% |
| Tsam.IV | Pt/H-Z | 30% | — | 15% |

FIG. 3

| NOx EMISSION CONTROL EFFICIENCY (%) BEFORE HEAT-AGING | | | | | | | |
|---|---|---|---|---|---|---|---|
| Temp.(°C) | 125 ~ 175 | | | 200 | 250 | 300 | 350 | 400 |
| Ex.I | 20 (140°C) | 67 (145°C) | 76 (160°C) | 57 | 35 | 15 | 5 | 1 |
| Ex.II | | 5 (145°C) | 75 (160°C) | 63 | 48 | 28 | — | 3 (390°C) |
| Ex.III | 9 (140°C) | | 69 (170°C) | 59 | — | 28 | 15 | 4 |
| Ex.IV | 9 (140°C) | | 70 (170°C) | 60 | 43 | 30 | 13 (340°C) | 8 (390°C) |
| Ex.V | 18 (130°C) | 72 (155°C) | | — | — | 22 | 10 | — |
| Ex.VI | 14 (140°C) | | 73 (165°C) | 62 | — | 28 | — | 5 (390°C) |
| Ex.VII | 9 (140°C) | | 73 (170°C) | 60 | — | 29 (290°C) | 4 (380°C) | |
| Ex.VIII | 6 (140°C) | | 68 (160°C) | 57 (205°C) | — | 23 | 3 (385°C) | |
| Ex.IX | 9 (140°C) | 77 (155°C) | | — | — | 22 (325°C) | | 5 (390°C) |
| Tsam.I | 5 (130°C) | | 35 (165°C) | — | 18 | 8 | — | — |
| Tsam.II | 5 (125°C) | | | 47 (190°C) | 38 (240°C) | 12 | 2 | — |
| Tsam.III | 11 (125°C) | | | 46 | 33 | 18 (300°C) | 1 (325°C) | — |
| Tsam.IV | | 11 (150°C) | 63 (170°C) | — | 25 (260°C) | 8 (310°C) | — | — |

FIG. 4

| NOx EMISSION CONTROL EFFICIENCY (%) AFTER HEAT-AGING | | | | | | | | |
|---|---|---|---|---|---|---|---|---|
| Temp.(°C) | 125 | 150 | 175 | 200 | 250 | 300 | 350 | 400 |
| Ex.I | — | 12 | 39 | 35 | 17 | 4 | — | — |
| Ex.II | 1 | — | 36 | — | 15 | 2 | — | — |
| Ex.III | 3 | — | 34 | — | 18 | 12 | — | — |
| Ex.IV | 5 | — | 37 | — | 11 | 5 | — | — |
| Ex.V | 6 | — | 41 (185°C) | | 16 | 5 | — | — |
| Ex.VI | 8 | — | 38 | — | 19 | 9 | — | — |
| Ex.VII | 8 | — | 40 | — | 18 | 8 | — | — |
| Ex.VIII | 4 | — | 35 | — | 15 | 5 | — | — |
| Ex.IX | 6 | — | 39 | — | 20 | 5 | — | — |
| Tsam.I | 5 | — | 31 | — | 13 | 1 (310°C) | — | — |
| Tsam.II | — | 5 (140°C) | — | 32 | 20 | 5 | — | — |
| Tsam.III | 4 | — | 38 | 18 (205°C) | 7 | 0 | — | — |
| Tsam.IV | — | 3 | 18 (180°C) | — | 7.5 | — | — | — |

FIG. 5

| | HC(%) | CO(%) | NOx(%) |
|---|---|---|---|
| Ex. II | 89.9 | 90.5 | 44.1 |
| Tsam.IV | 74.3 | 76.9 | 20.1 |

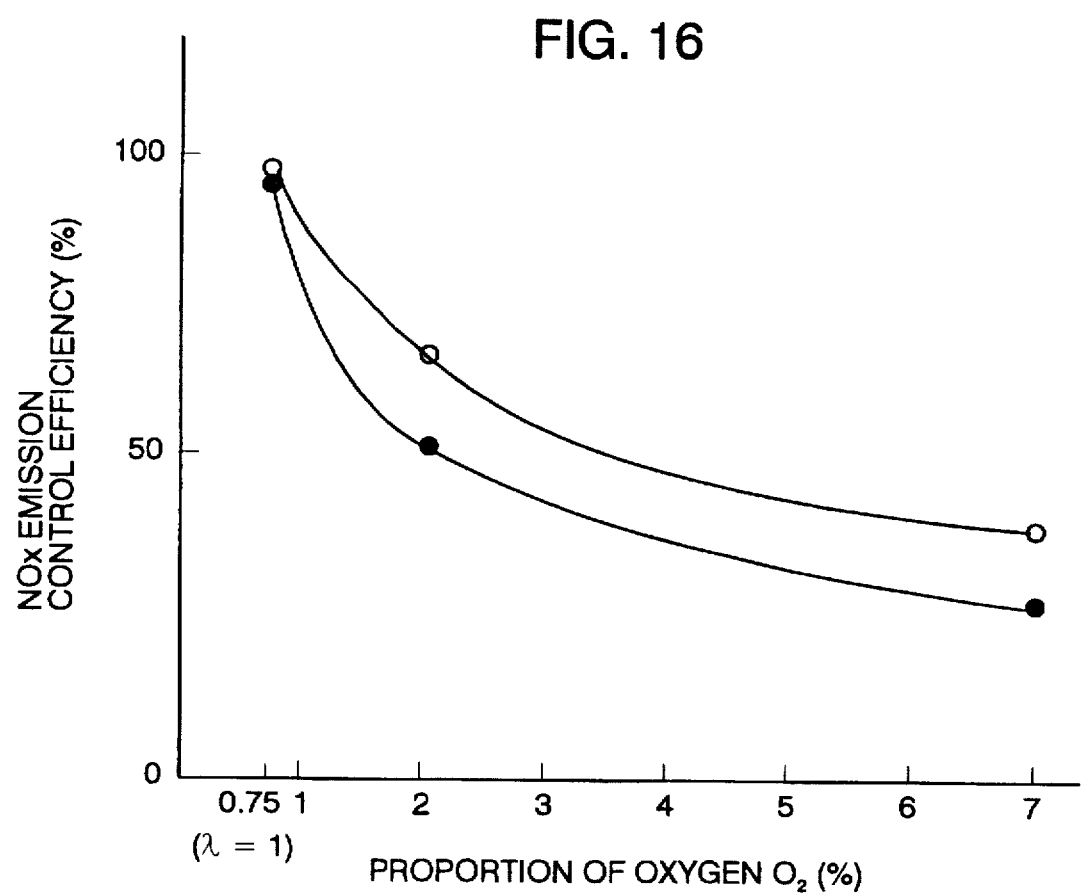

BURNED GAS PURIFYING CATALYST

BACKGROUND OF THE INVENTION

1. Field of the Invention

The invention relates to a gas purifying catalyst, and, more particularly, to a burned gas purifying catalyst for use with an exhaust system of an automobile engine suitable for emission level controls of nitrogen oxides (NOx), hydrocarbons (HC) and carbon monoxide (CO).

2. Description of the Related Art

It is typical to use noble metals as catalyst materials supported by a zeolite support for a catalytic converter installed in an exhaust line of an automobile engine to purify the exhaust gas or to significantly lower emission levels of oxides of nitrogen (NOx) as well as hydrocarbons (HC) and carbon monoxide (CO) in the exhaust gas, in particular, when a lean air-fuel mixture which is leaner than a stoichiometric air-fuel mixture burns. As is known from, for instance, Japanese Unexamined Patent Publication No. 3-232533, noble metals such as platinum (Pt), rhodium (Rh) and palladium (Pd) are typically employed as catalyst materials together with a zeolite support. In the Japanese Unexamined Patent Publication No. 3-232533, in order to improve the durability of the catalyst against high heat, the most suitable amount of the noble metal catalyst has been investigated.

Another type of catalytic converter having been widely used in exhaust systems of automobiles is a three-layer monolith honeycomb catalytic converter such as known from, for instance, Japanese Unexamined Patent Publication No. 6-190282. This three-layer monolith honeycomb type catalytic converter has an over catalyst layer comprised of cuprum (Cu) supported by a zeolite support, an intermediate catalyst layer comprised of rhodium (Rh) supported by an alumina support and an under catalyst layer comprised of a mixture of platinum (Pt) supported by an alumina support, palladium (Pd) supported by an alumina support and ceria or a cerium oxide.

In the case where a zeolite group of catalyst materials support a noble metal catalyst material, while the catalyst can reduce nitrogen oxides (NOx) in the exhaust gas produced as a result of combustion of a lean air-fuel mixture, the problem encountered by the catalyst material is that the noble metal is sintered and deteriorates due to exposure to high temperatures of exhaust gases. Even the catalyst of platinum supported by a zeolite support which is one of catalysts resistive to high temperatures is hard to avoid sintering when exposed to an exhaust gas whose temperature is higher than approximately 900° C. High heat-resistive catalysts have a constraint on their active temperatures, which must always be in a narrow range, and experience low emission control efficiency in connection with nitrogen oxides (NOx) at low exhaust gas temperatures. A catalyst of cuprum (Cu) supported by a zeolite support encounters aggravation of heat-resistance.

SUMMARY OF THE INVENTION

It is an object of the present invention to provide a catalyst construction for purifying gases which provides an improvement in activity at both low and high temperatures and heat-resistance without hydrocarbon poisoning of a palladium catalyst material.

It is another object of the present invention to provide an catalyst construction for purifying automobile exhaust gases which provides a significant improvement in NOx emission control efficiency.

This invention has been achieved on the basis of the knowledge obtained from various investigations and assessment conducted by the inventors of this application for catalysts that using catalyst materials of palladium, alumina and platinum in combination supported by a zeolite group of supports yield a significant improvement in low temperature catalyst activity and heat-resistance and that the zeolite supported platinum catalyst material prevents hydrocarbon poisoning of the palladium.

These objects of the present invention are achieved by providing a gas purifying catalyst construction comprising an under catalyst layer coated on a catalyst carrier and an over catalyst layer coated over the under catalyst layer. The over catalyst layer contains catalyst materials of platinum and rhodium supported by a support of crystalline metal silicate, and the under catalyst layer contains a catalyst material of palladium.

Crystalline metal silicates are a porous material whose pore structure has a majority of microscopic pores and includes an aluminum group of metals as a main metal component of the crystal. Aluminosilicate, i.e., zeolite, which is typical as an aluminum group metal, includes Y-type zeolite, moldenite, MFI-type zeolite, β-type zeolite. In place of aluminum (Al) or together with aluminum (Al), metal silicates containing gallium (Ga), cerium (Ce), manganese (Mn) or terbium (Tb) may be employed.

Catalyst of this invention prevents hydrocarbon poisoning of the palladium and provides an improvement in low temperature catalytic activity and heat-resistance. Specifically, the palladium exhibits its catalytic activity at lower temperatures as compared with platinum and rhodium catalytic materials and burns hydrocarbons (HC) in exhaust gases at low temperatures from an automobile engine which is still cold. Consequently, even when the exhaust gas is still at low temperatures, the combustion of hydrocarbons (HC) by means of the under catalyst layer causes the over catalyst layer to rapidly raise its temperature sufficiently high necessary for the hydrocarbons (HC) to burn The combustion of hydrocarbons (HC) is utilized to reduce or decompose nitrogen oxides (NOx) in burned gases. In the case where the catalyst is installed in the exhaust line of an automobile engine, the catalytic converter is often installed to the under side of a floor of the vehicle where it is unusual for the temperature of an exhaust gas to rise higher than 400° C. even after the engine has been warmed up. As compared with this, because the platinum/zeolite group of catalysts are active at temperatures of approximately 180° C. or higher, which is significantly lower than those of the Cu/zeolite group of catalysts which are active at approximately 400° C. or higher, the accelerated temperature rise of the under catalyst layer provides an improvement in NOx emission control efficiency. In this instance, this is considered to result from the event that the over catalyst layer promotes the reduction or decomposition of nitrogen oxides (NOx) through reaction of an intermediate product as a reduction agent during the combustion of hydrocarbons.

While the palladium in the under catalyst layer experiences less deterioration in catalytic activity in an oxidizing atmosphere, it suffers hydrocarbon poisoning when contacting a great amount of hydrocarbons and deteriorates in catalytic activity. On the contrary, since the metal silicate has high ability to adsorb hydrocarbons, even if the over catalyst layer burns an insufficient amount of hydrocarbons while the engine is still cold, the over catalyst layer adsorbs hydrocarbons in the burned gas with the metal silicate, preventing hydrocarbon poisoning of the palladium in the under catalyst layer.

Although platinum and rhodium generally deteriorate when exposed to high temperature burned gases and are unfavorable in point of burning hydrocarbons, the catalyst of the invention in which the platinum and rhodium are supported not by an alumina support but by a metal silicate support yields an improved heat-resistance. Specifically, since the metal silicate used as a catalyst support for noble metals such as platinum, rhodium and palladium is thermally stable, these noble metals are hard to encounter deterioration due to sintering of the metal silicate used as their support material support rather than an alumina support. In particular, although the platinum and rhodium are generally apt to experience the effect of sintering of their support material, the catalyst of the invention is prevented from suffering the sintering of the support material because the platinum and rhodium are less in amount than the palladium. Further, although, unlike the palladium, the platinum and rhodium are apt to lower their catalytic activity when oxidized, the invention employs the metal silicate as a support material for the platinum and rhodium because of the fact that the alumina works as a source of oxygen supply more easily as compared with the metal silicate.

On the other hand, because of high heat-resistance of the palladium, the under catalyst layer encounters less heat deterioration and burns hydrocarbons with a relatively high efficiency even after having been exposed to high temperature burned gases. Consequently, the combustion of hydrocarbons by means of the under catalyst layer provides the effect of heating the over catalyst layer and causes the reduction or decomposition of nitrogen oxides with a high efficiency.

A small amount of palladium may be added into the over catalyst layer with the effect of improving the activity of the catalyst at low temperatures. Further, the platinum and rhodium may be added into the under catalyst layer.

Various methods may be employed in order to support the catalytic metals, platinum and rhodium. For instance, a step of impregnating with the catalytic metals a coating of a metal silicate support washcoated on a catalyst carrier may be taken, or otherwise, steps of spraydrying a mixture of the catalytic metals and metal silicate support and washcoating the dried composition on a catalyst carrier may be taken.

The catalyst construction, if necessary, may be modified in that an intermediate layer is formed between the over and under catalyst layers. The catalyst construction may be permitted to contain impurities of 1% of the total amount of the catalyst layers.

The catalyst with the over catalyst layer coated directly on the under catalyst layer provides a rapid rise in temperature of the over catalyst layer and an improvement in nitrogen oxide reduction efficiency of the over catalyst layer due to the heat of combustion of hydrocarbons by the aid of the presence of the palladium.

Because palladium is inferior in the oxidizing ability as compared with platinum, the catalyst of the invention uses not metal silicate but alumina as a support for the palladium. In particular, in view of the fact that, unlike platinum and rhodium, the palladium is an appropriate material to easily exhibit its catalytic activity rather after having been oxidized, the catalyst of the invention employs the alumina capable of working more easily as a source of oxygen supply as a support for the palladium.

In order to support the palladium as a catalytic metal, a step of impregnating with the palladium a coating of an alumina support washcoated on a catalyst carrier may be taken, or otherwise steps of spraydrying a mixture of the palladium and alumina and washcoating the dried composition on a catalyst carrier may be taken.

The under catalyst layer may comprise a crystalline metal silicate as a support for the palladium. The under catalyst layer having the metal silicate support for the palladium is not significantly different in hydrocarbon burning efficiency from an under catalyst layer having an alumina support and is contributory to an improvement in low temperature catalytic activity. Because the metal silicate has the ability of absorbing hydrocarbons greater rather than the alumina, the under catalyst layer with the palladium supported by the metal silicate prevents hydrocarbon poisoning of the palladium and, insofar as the hydrocarbon poisoning of the palladium is prevented, the catalyst provides an improvement in durability.

When either one or both of the over and under catalyst layers contain a cerium oxide, the catalyst produces an improvement in NOx emission control efficiency for high temperature burned gases. Although the reason for a decline in NOx emission control efficiency of a catalyst at high temperatures is generally considered to result from the event that hydrocarbons easily burn as the temperature rises and, however, become hard to produce intermediate products of the hydrocarbons, the catalyst with a cerium oxide contained, however, suppresses the combustion of hydrocarbons at high temperatures and easily produces intermediate products of the hydrocarbons. The cerium oxide may be added into the over catalyst layer in such a manner to mix cerium oxide particles with a powdered catalyst composition of platinum and rhodium supported by a metal silicate support so as to support the platinum and rhodium particles by a mixture of the metal silicate particles and cerium oxide particles, or to mix the platinum and rhodium particles supported by a metal silicate with the platinum and rhodium particles supported by a cerium oxide. Because, although ceria may be employed as the cerium oxide, it is apt to experience thermal deterioration, a double oxide of cerium (Ce) and zirconium (Zr) is preferable in view of thermal resistance. It is also admitted to add alumina together with a cerium oxide.

If a small amount of palladium is added into the over catalyst layer, it is preferred to support the palladium by a cerium oxide or alumina so as to deposit the palladium separately from the rhodium in the over catalyst layer. This is because the palladium and rhodium are apt to interact with each other and lower their catalytic performance.

The catalyst comprises the over catalyst layer whose weight proportion relative to the whole catalyst layer is in a range between 8/40 and 34/40. If the lower limit is exceeded, it will be difficult to form the over catalyst to completely cover the under catalyst layer. On the other hand, if the upper limit is exceeded, the over catalyst layer arrests the catalytic effect of the palladium in the under catalyst layer. The over catalyst layer contains the rhodium whose weight proportion relative to the platinum is in a range between 1/90 and 2/5. The upper limit was established based on the fact that, while even a small amount of rhodium interacts with platinum and assists the platinum in reducing nitrogen oxides (NOx), nevertheless, a large amount rhodium causes deterioration in durability and catalytic performance of the catalyst through interaction with the palladium in the under catalyst layer.

The catalyst with alumina added into the over catalyst layer produces an improvement in NOx emission control efficiency at high temperatures. Although the reason for a decline in NOx emission control efficiency of a catalyst at high temperatures is generally considered to result from the event that hydrocarbons easily burn as the temperature rises and it becomes hard to produce intermediate products of the hydrocarbons, the catalyst of the invention which contains alumina, however, suppresses the combustion of hydrocarbons at high temperatures and easily produces intermediate products of the hydrocarbons.

The catalyst of the invention, when applied especially to a monolith honeycomb type of catalytic convertor for a lean burn engine, works to significantly lower the emission level of nitrogen oxides (NOx) of the exhaust resulting from combustion of an air-fuel mixture leaner than a stoichiometric air-fuel mixture. In particular, the catalyst is effective to the exhaust whose oxygen concentration is higher than 3% in particular 5%.

The catalyst containing palladium in the under catalyst layer and platinum and rhodium in the over catalyst layer exhibits significantly excellent performance of reducing nitrogen oxides (NOx) in an engine exhaust gas resulting from combustion of an air-fuel mixture leaner than a stoichiometric air-fuel mixture to nitrogen ($N_2$).

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 1 is a schematic cross-sectional view showing a structure of a catalyst in accordance with an embodiment of the invention;

FIG. 2 is a table describing design specifications of catalysts of Examples I–IX and evaluation sample catalysts I–IV;

FIG. 3 is a table showing the results of temperature dependency tests of NOx emission control efficiency of the respective fresh catalysts before heat-aging treatment;

FIG. 4 is a table showing the results of temperature dependency tests of NOx emission control efficiency of the respective catalysts after the heat-aging treatment;

FIG. 5 is a table showing the results of tests of emission control efficiency of the respective catalysts in the 10–15 mode;

FIG. 16 is a graph showing the effect of the presence of ceria in the over catalytic layer on NOx emission control efficiency.

DETAILED DESCRIPTION OF THE PREFERRED EMBODIMENTS

Figure 6:
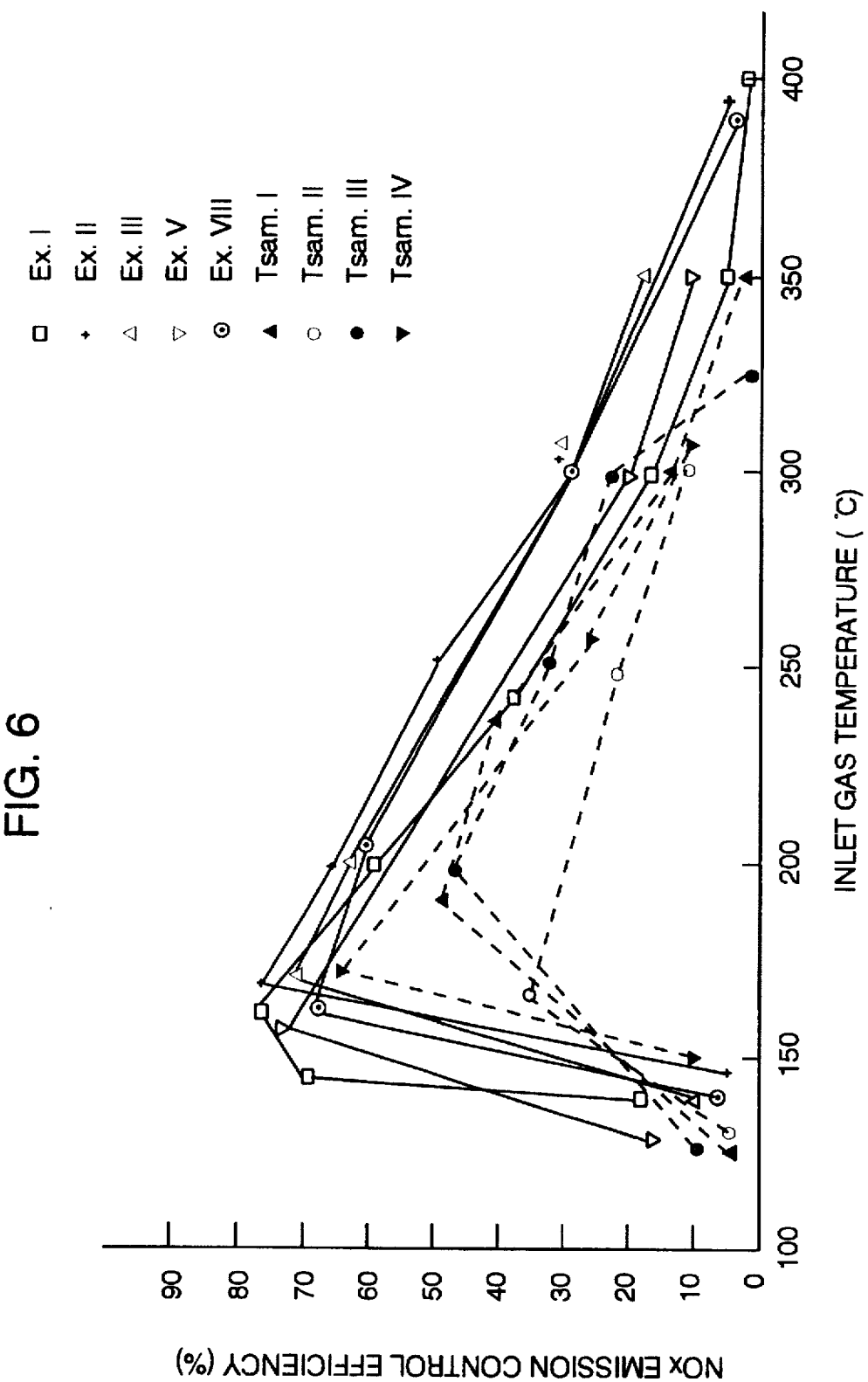
FIG. 6 is a graph showing NOx emission control efficiency of the fresh catalysts of Examples I–III, V and VIII.

Referring to the drawings in detail, in particular to FIG. 1 schematically showing a catalytic converter 1 to be installed in an exhaust line of an automobile engine to purify the exhaust gas. A catalyst carrier 2 which is of monolith honeycomb construction having, for instance, 400 cells per square inch to allow a burned gas to flow through is coated with an under or first catalyst layer or coating 4 and treated with an over or second catalyst layer or coating 3.

EXAMPLE I

The under catalyst layer 4 was formed by washcoating a slurry of a composition of powdered alumina of a particle size of less than 4 μm and a purity of higher than 95% and alumina binder mixed with an appropriate amount of water on the cordierite monolith honeycomb carrier 2, burning the coating at 500° C. for two hours and impregnating the coating with a palladium solution. This palladium impregnation was carried out by impregnating the coating with a palladium nitrate solution of a specified concentration and, after having dried the coating, burning the coating at 500° C. for two hours.

For the over catalyst layer 3, a mixture of an acid solution of dinitro-diamine platinum (II) nitrate and a rhodium nitrate solution and H- and MFI-type powdered zeolite ($SiO_2/Al_2O_3$) was prepared. This mixture was spraydried as a powdered catalyst composition of platinum and rhodium supported by the zeolite. This powdered catalyst composition (Pt-Rh/Z catalyst composition) was further mixed with an alumina binder solution. The over catalyst layer 3 was formed on the cordierite monolith honeycomb carrier 2 in such a way that after the slurry of the Pt-Rh/Z catalyst composition mixed with the alumina binder had been washcoated over the under catalyst layer 4, the slurry coating was dried and burned at 500° C. for two hours.

The under catalyst layer 4 was comprised of the coating of 15% by weight of the cordierite monolith honeycomb carrier 2 and contained the alumina, excepting alumina binder, of an amount of 13.5% by weight of the cordierite monolith honeycomb carrier 2. The over catalyst layer 3 was comprised of the coating of 30% by weight of the cordierite monolith honeycomb carrier 2 and contained the zeolite of 24% by weight of the cordierite monolith honeycomb carrier 2. The amount of the palladium contained in the under catalyst layer 4 was 6 grams per one liter of the volume of the cordierite monolith honeycomb carrier 2. The amount of the composition of platinum and rhodium in the over catalyst layer 3 was 1.6 grams per one liter of the volume of the cordierite monolith honeycomb carrier 2, and the weight proportion between the platinum and rhodium was 75:1. Impurities contained in the catalyst layers 3 and 4 were less than 1%.

EXAMPLE II

A mixture of a powdered Pt-Rh/Z catalyst composition and ceria of a particle size of less than 4 μm and a purity of greater than 95% was prepared for the over catalyst layer 3. A predetermined amount of the mixture was mixed with an alumina binder solution. An over catalyst layer 3 was formed by washcoating the slurry over an under catalyst layer 4, which was the same in construction as that of the Example I, and drying and burning the coating at 500° C. for two hours. In this case, the over catalyst layer 3 contained the ceria of 30% by weight of the coating, and the total volume of the platinum and rhodium composition was 1.6 g per one liter of the volume of the cordierite monolith honeycomb carrier 2.

EXAMPLE III

In this example the over catalyst layer 3 described in Example II was modified in that the concentration of the platinum and rhodium composition in the solution was 1.1 grams per liter.

EXAMPLE IV

In this example the over and under catalyst layers 3 and 4 described in Example I were modified in that the coating was 15% by weight of the cordierite monolith honeycomb carrier 2 for the over catalyst layer 3 and 30% by weight of the cordierite monolith honeycomb carrier 2 for the under catalyst layer 4.

EXAMPLE V

In this example the over and under catalyst layers 3 and 4 described in Example I were modified in that the catalyst support was comprised of a mixture of the H- and MFI-type powdered zeolite ($SiO_2/Al_2O_3$) and ceria for the over catalyst layer 3 and the H- and MFI-type powdered zeolite ($SiO_2/Al_2O_3$) for the under catalyst layer 4.

EXAMPLE VI

In this example the under catalyst layer 4 described in Example I was modified in that an aluminum coating was impregnated with a catalyst composition of palladium and lanthanum (La). The concentration of the palladium was 6.9 grams per one liter of the volume of the cordierite monolith honeycomb carrier 2. The amount of the lanthanum was 8% by weight of the aluminum in the under catalyst layer 4, i.e., 8 parts by weight of the lanthanum relative to 100 parts by weight of the aluminum. The weight of each of the over and under catalyst layers 3 and 4 was the same as those of Example I.

The under catalyst layer 4 was formed by impregnating a coating of a slurry of the powdered alumina on the cordierite monolith honeycomb carrier 2 with a palladium solution and, after having dried the palladium impregnated coating, with a lanthanum salt solution. Finally, the palladium and lanthanum impregnated coating was burned at 500° C. for two hours. In this case lanthanum nitrate was used as the lanthanum salt. The alumina coating may be impregnated with palladium and lanthanum, simultaneously.

EXAMPLE VII

In this example the under catalyst layer 4 described in Example I was modified in that the alumina coating was impregnated with a composition of palladium, lanthanum and barium. The amount of the palladium was 6.9 grams per one liter of the volume of the cordierite monolith honeycomb carrier 2. The amounts of the lanthanum and barium were 4% by weight of the aluminum in the under catalyst layer 4. The impregnation of the barium was made by the use of a solution of a barium salt such as barium nitrate.

EXAMPLE VIII

In this example the over and under catalyst layers 3 and 4 described in Example I were modified in that a mixture of powdered H- and MFI-type zeolite and alumina was used as a support for a catalyst composition of platinum and rhodium for the over catalyst layer 3, and alumina was used as a support for palladium for the under catalyst layer 4. The amount of the alumina was 30% by weight of the coating, and the amount of the palladium was 6.9 grams per one liter of the volume of the cordierite monolith honeycomb carrier 2.

EXAMPLE IX

In this example the under catalyst layer 4 described in Example II was modified in that a mixture of alumina and ceria was used as a support for a composition of platinum, lanthanum and barium. The under catalyst layer 4 contained ceria of 30% by weight of the coating. The amount of the palladium was 6.9 grams per one liter of the volume of the cordierite monolith honeycomb carrier 2. Further, the amounts of each of the lanthanum and barium was 4% by weight of alumina in the under catalyst layer. The weight proportion between the over and under catalyst layers 3 and 4 was the same as those of Example I.

The under catalyst layer 4 was formed by impregnating with a palladium salt, a lanthanum salt and a barium salt in this order a coating of a slurry of powdered alumina and powdered ceria on the cordierite monolith honeycomb carrier 2 and burning the catalyst coating.

In order to make comparative evaluation of the catalytic performance of the catalysts described in Examples I through IX, evaluation sample catalysts I to IV were prepared.

First sample catalyst I was comprised of a single catalyst layer by coating a slurry of palladium supported by alumina on a catalyst support by a washcoating method. The amount of the palladium was 6.9 grams per one liter of the volume of the cordierite monolith honeycomb carrier 2. The single catalyst layer was 45% by weight of the carrier and had the alumina of 40% by weight of the coating.

Second sample catalyst II was comprised of a single catalyst layer by coating a slurry of platinum and rhodium of a weight proportion of 75:1 and an alumina support. The total amount of the palladium and rhodium was 1.6 g per one liter of the volume of the cordierite monolith honeycomb carrier 2. The single catalyst layer was 45% by weight of the carrier and contained the alumina of 40% by weight of the carrier.

Third sample catalyst III was comprised of double catalyst layers. An under catalyst layer was formed as a coating of a slurry of palladium and an alumina support, which is just the same in construction and coated by the same coating method as the under catalyst layer 4 described in Example I. An over catalyst layer was formed by coating a slurry of platinum and rhodium of a weight proportion of 75:1 and an alumina support. The total amount of the palladium and rhodium was 1.6 g per one liter of the volume of the cordierite monolith honeycomb carrier 2. The over catalyst layer was 30% by weight of the carrier and had the alumina of 24% by weight of the coating. The under catalyst layer was 15% by weight of the carrier and had the alumina of 13.5% by weight of the coating.

Fourth sample catalyst IV was comprised of a single catalyst layer of platinum supported by H- and MFI-type zeolite. The single catalyst layer was 45% by weight of the carrier and had the zeolite of 13.5% by weight of the coating.

The structural specifications of the examples I–IX and sample catalysts I–IV are listed in Table I in FIG. 2. In Table I, symbols "H-Z" and W/C refer to the H- and MFI-type zeolite and the amount of a coating as a catalyst layer, respectively.

EVALUATION

Figure 7:
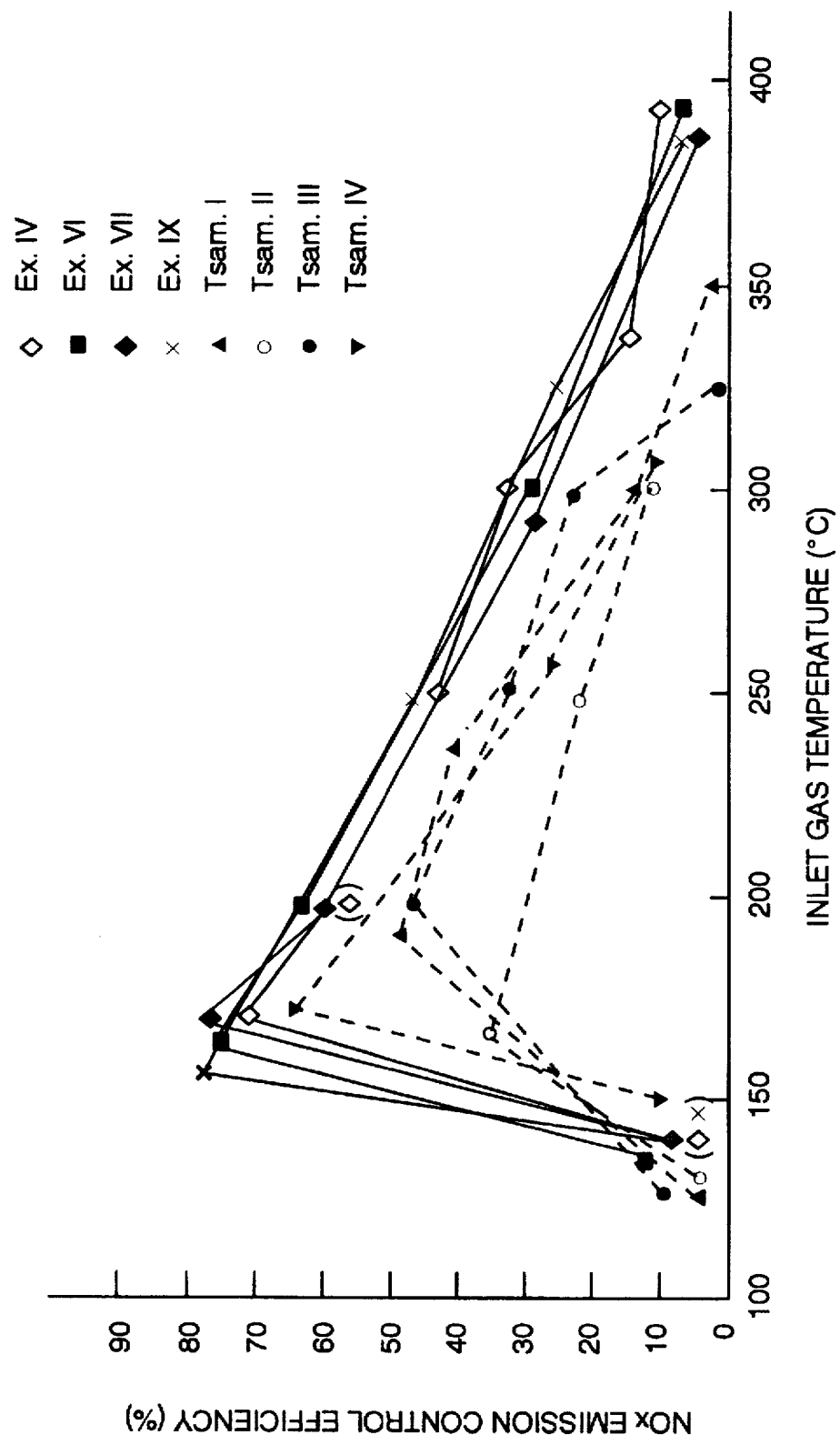
FIG. 7 is a graph showing NOx emission control efficiency of the fresh catalysts of Examples IV, VI, VII and IX.

In order to assess the temperature dependency of NOx emission control efficiency of the examples I–IX and sample catalysts I–IV, tests were conducted by the utilization of a fixed bed flow-through type reaction system. Fresh catalysts and aged catalysts after heat-aging treatment were prepared as test samples for the respective examples I–IX and sample catalysts I–IV. The heat-aging treatment was carried out by leaving each test sample in the air at a temperature of 900° C. for 50 hours. Evaluation of the temperature dependency of NOx emission control efficiency was made from measurements of NOx emission control efficiency of the catalyst set in the fixed bed flow-through type reaction system through which a pre-heated gas simulated to have an air-fuel ratio A/F of 22 was forced to travel. The result of measurements is shown in FIGS. 3, 6 and 7 for the fresh catalysts and in FIGS. 4, 8 and 9 for the catalysts after the heat-aging treatment.

The gas used was simulated as follows:
HC 4,000 ppm
NO 250 ppm
CO 0.15%
$CO_2$ 7.7%
$H_2$ 150 ppm
$O_2$ 7%
$N_2$ the rest As apparent from FIGS. 3, 6 and 7, the result proves that the fresh catalysts of Examples I–IX at low temperatures demonstrate NOx emission control efficiencies higher than the highest NOx emission control efficiency among the sample catalysts I–IV, i.e., of the fourth sample catalyst having the platinum supported by the H- and MFI-type zeolite and that the catalysts comprised of double catalyst layers provide an effective improvement in catalytic activity at low temperatures. This is considered to result from the activation of the over catalyst layer even at low gas temperatures due to heat of the combustion of hydrocarbons by means of the palladium in the under catalyst layer which contributes to an increase in temperature of the over catalyst layer. The catalysts of Examples I and IX exhibit excellent catalytic activity at, in particular, low temperature.

With regard to NOx emission control efficiency at high temperatures, the fresh catalysts of Examples I–IX demonstrate NOx emission control efficiencies higher than those of the sample catalysts I–IV. In particular, the catalysts of Examples II, III and IX, each of which contains the ceria in the over catalyst layer, demonstrate excellent results. While the catalyst of Example V contains the ceria as a support for the platinum and rhodium in the over catalyst layer, it provides an improvement in high temperature catalytic activity less than those of Examples II and III. The catalyst of Example VII, which contains the alumina as an additional support in the over catalyst layer shows a NOx emission control efficiency higher than that of the catalyst of Example I, which does not contain alumina as a support in the over catalyst layer. This fact proves that the addition of alumina provides the effect of increasing high temperature catalyst activity. Further, the fact that the catalysts of Examples VI, VII and IX, each of which contains either one or both of lanthanum (La) and barium (Ba), show high NOx emission control efficiencies at high temperatures proves that the addition of lanthanum and/or barium is contributory to an improvement in high temperature catalyst activity.

Figure 8:
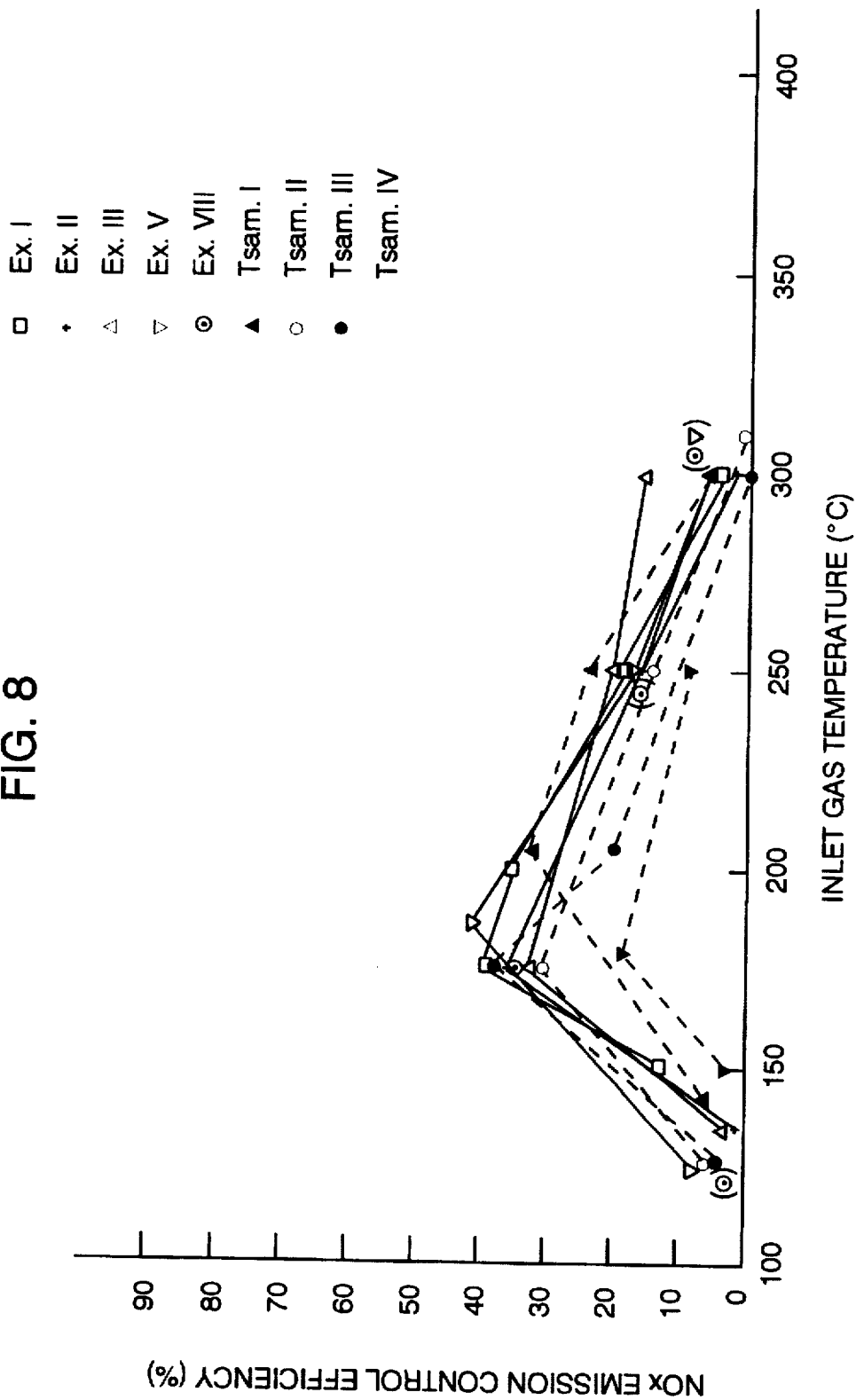
FIG. 8 is a graph showing NOx emission control efficiency of the catalysts of Examples I–III, V and VII and the sample catalyst I–IV, all before the heat-aging treatment.
Figure 9:
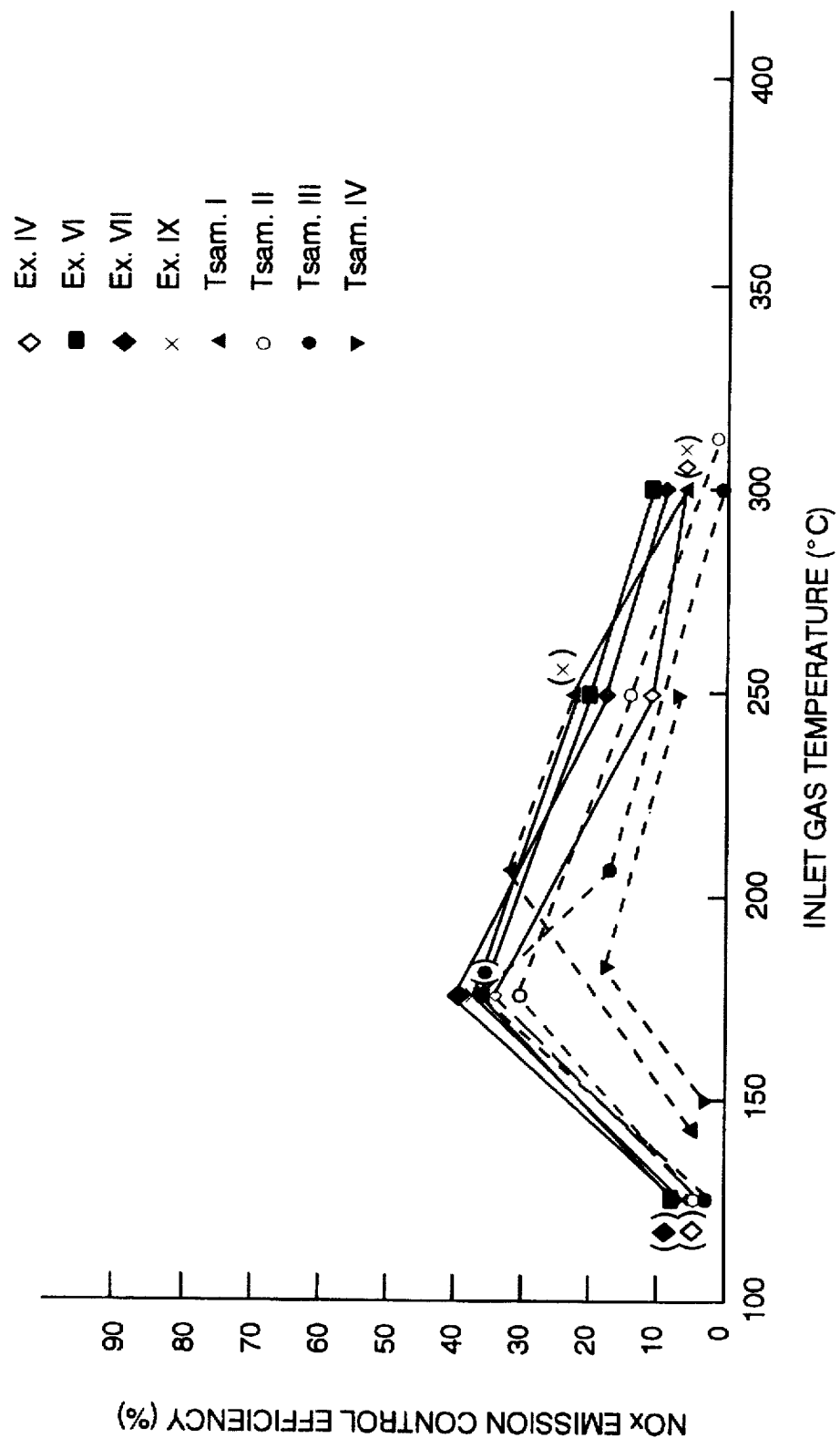
FIG. 9 is a graph showing NOx emission control efficiency of the catalysts of Examples IV, VI, VII and IX and the sample catalyst I–IV, all after the heat-aging treatment.

As clearly understood from FIGS. 4, 8 and 9 showing the result of evaluation tests conducted for the respective catalysts after the heat-aging treatment, it is proved that the low temperature NOx emission control efficiency of the catalyst of each Example is higher on the whole than those of the sample catalysts I–IV. This fact demonstrates that thermal deterioration or degradation of the over catalyst layer is made up for by an improved catalytic activity of the under catalyst layer resulting from heat of the combustion of hydrocarbons in the under catalyst layer. All of the catalysts of Examples I–IX demonstrate favorable NOx emission control efficiencies even at high temperatures. In particular, the fact that the catalysts of Examples VI, VII and IX, each of which contains either one or both of the lanthanum and barium, demonstrate high NOx emission control efficiencies at both high and low temperatures proves that the addition of lanthanum and/or barium is contributory to an improvement in heat resistance of the catalysts. In this instance, the second sample catalyst II, which comprises of a single catalyst layer containing the platinum and rhodium supported by the alumina, shows high catalytic activity at high temperatures and, however, only low catalytic activity at low temperatures.

Further, with regard to the catalysts of Example II and the fourth sample catalyst IV, both after the heat-aging treatment, practical tests were conducted to evaluate the emission control efficiency in a 10–15 mode by the utilization of an automobile equipped with a lean burn engine of 1,500 cc displacement. The result is shown in FIG. 5. As understood from the result, the catalyst of Example II shows a NOx emission control efficiency over twice that of the fourth sample catalyst IV and reduces emission levels of hydrocarbons and carbon monoxide significantly lower than those of the fourth sample catalyst IV. This fact proves that the double layer catalyst provides an excellent exhaust gas purifying efficiency.

Various investigations were conducted in order to define the most appropriate structural specifications of the catalyst.

Figure 10:
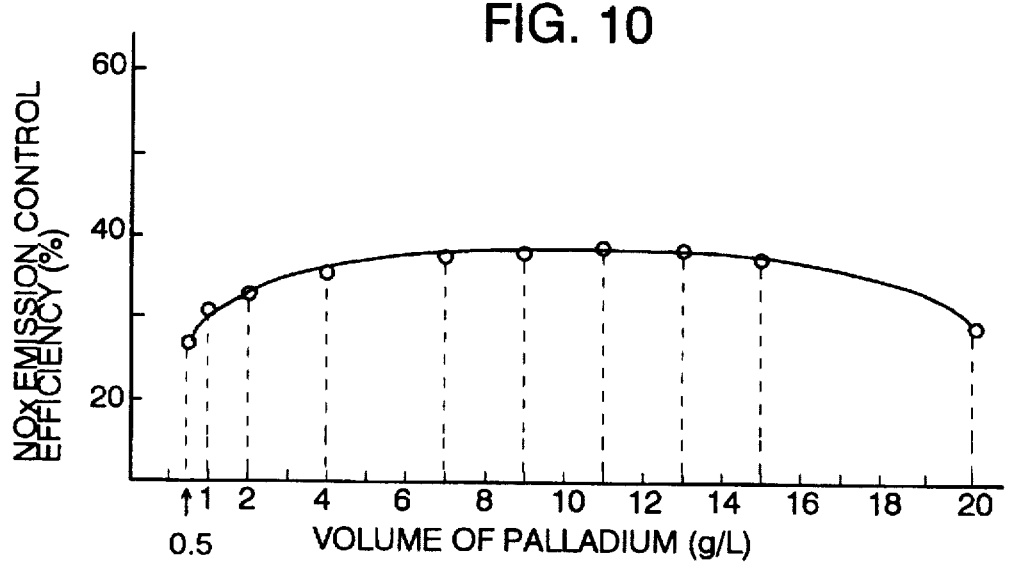
FIG. 10 is a graph showing the effect of the amounts of palladium in the under catalyst layer on NOx emission control efficiency.

In order to define the most appropriate range of amounts of palladium in the under catalyst layer which can show desired NOx emission control efficiencies, sample catalysts prepared were comprised of an under catalyst layer of palladium supported by alumina and an over catalyst layer of a mixture of a powdered composition of platinum and rhodium of a weight proportion of 75:1 supported by the H- and MFI-type zeolite and ceria of 30% by weight of the under catalyst layer. The coatings for the under and over catalyst layers were 30% and 15% by weight of a cordierite monolith honeycomb carrier, respectively. The amounts of the platinum and rhodium in the over catalyst layer were 1.5 grams and 0.02 grams per one liter of the volume of the monolith honeycomb carrier, respectively. These sample catalysts were tested by being exposed to the same exhaust gas (A/F=22) as used in the evaluation of NOx emission control efficiency of the Examples I–IX after heat-aging treatment in the air at a temperature of 900° C. for 50 hours. The result of the measurements of NOx emission control efficiency is shown in FIG. 10.

The result demonstrates that the catalyst produces only a slight effect of NOx emission control when containing a small amount of palladium and that the catalyst does not show its NOx emission control efficiency higher than a certain level even when containing a large amount of palladium and rather shows a tendency to lower its NOx emission control efficiency. Reasons for this tendency can be considered that, because the exhaust gas reaches the under catalyst layer penetrating through the over catalyst layer, the under catalyst layer is less effective to the exhaust gas if containing only a small amount of palladium and causes excessive combustion of hydrocarbons which is not always effectively contributory to reduction of nitrogen oxides if containing an inappropriately large amount of palladium. It is also from the fact that an appropriate range of amounts of palladium is between 2 and 15 grams per one liter of the volume of the monolith honeycomb carrier and, more appropriately between 6 and 13 grams per one liter of the volume of the monolith honeycomb carrier.

Figure 11:
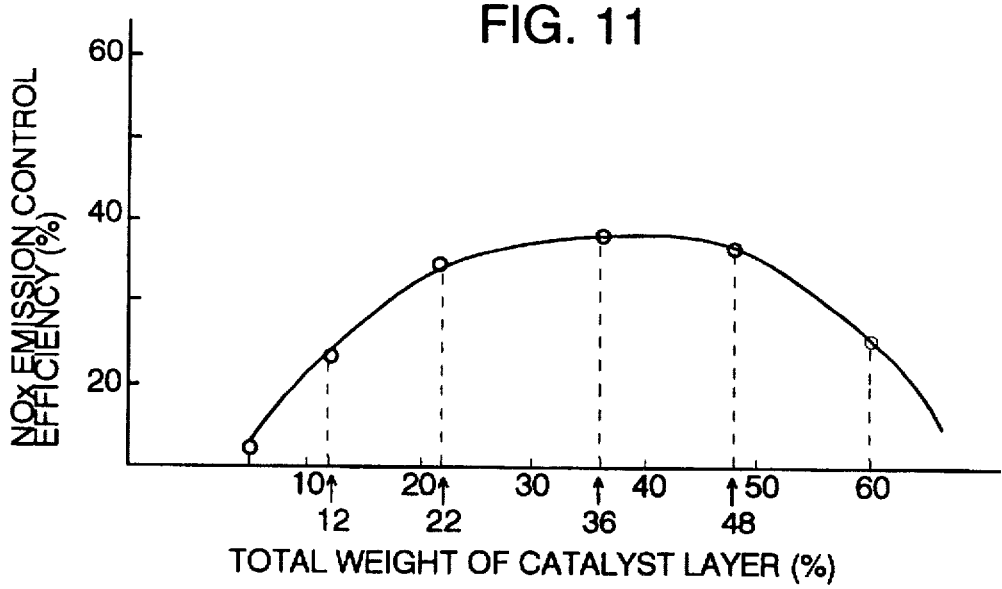
FIG. 11 is a graph showing the effect of the total amount of the over and under catalyst layers on NOx emission control efficiency.

In order to define the most appropriate range of total amounts of the under and over catalyst layers relative to the monolith honeycomb carrier, investigation of the effect of the total amount of catalyst on NOx emission control efficiency was conducted for various amounts of sample catalysts. Sample catalysts prepared were comprised of an under catalyst layer of palladium supported by a mixture of alumina and ceria and an over catalyst layer of a mixture of a powdered composition of platinum and rhodium of a weight proportion of 75:1 supported by a mixture of the H- and MFI-type zeolite and ceria. In the under catalyst layer, the amount of palladium was 7 grams per one liter of the volume of the monolith honeycomb carrier. In the under catalyst layer, the amount of the composition of platinum and rhodium was 1.1 grams per one liter of the volume of the monolith honeycomb carrier, and the amount of the ceria was 30% by weight of the under layer coating. Each sample catalyst had a weight proportion of the over and under catalyst layers of 1:1. These sample catalysts were tested by being exposed to the same exhaust gas (A/F=22) as used in the evaluation of NOx emission control efficiency of the Examples I-IX after heat-aging treatment in the air at a temperature of 900° C. for 50 hours. The result of measurements of NOx emission control efficiency is shown in FIG. 11.

The result demonstrates that the catalyst produces a decrease in NOx emission control efficiency with a decrease in the total amount of the catalyst layers. This fact proves that a small amount of catalyst produces aggravation of its chemical durability. Similarly, the result demonstrates that the catalyst produces a decrease in NOx emission control efficiency with an increase in the total amount of the catalyst layers. This decrease is considered to result from a decrease in the surface-volume ratio of the monolith honeycomb carrier. It is proved from the fact that an appropriate range of the total amounts of catalyst is between 22 and 48% by weight of the monolith honeycomb carrier and, more appropriately approximately 36% by weight of the monolith honeycomb carrier.

Figure 12:
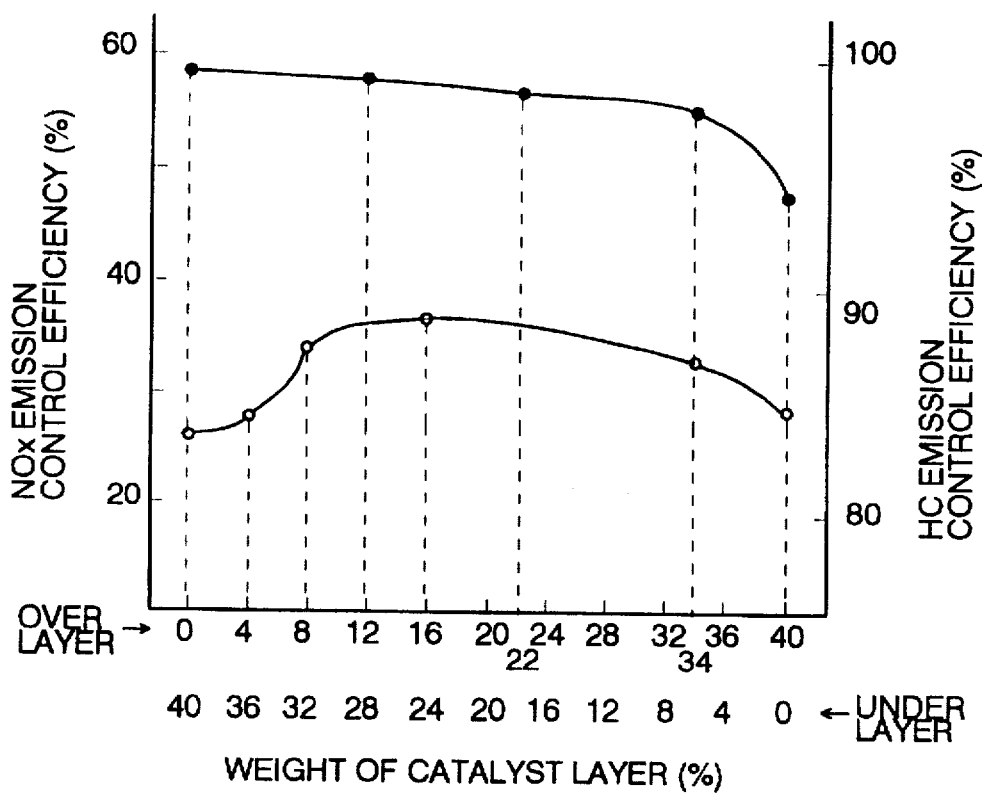
FIG. 12 is a graph showing the effect of the amount of each of the over and under catalyst layers on NOx emission control efficiency.

Further, in order to define appropriate weight proportions of the over and under catalyst layers, the effect of weight proportions of the over and under catalyst layers on NOx emission control efficiency was investigated with regard to various sample catalysts having different proportions of the over and under catalyst layers. Each sample catalyst prepared had the total amount of the catalyst layers of 40% by weight of the monolith honeycomb carrier. The amount of the palladium in the under catalyst layer was 7 grams per one liter of the volume of the monolith honeycomb carrier, and the amount of the composition of platinum and rhodium in the under catalyst layer was 1.1 grams per one liter of the volume of the monolith honeycomb carrier. These sample catalysts were tested by being exposed to the same exhaust gas (A/F=22) as used in the evaluation of NOx emission control efficiency of the Examples I-IX after heat-aging treatment in the air at a temperature of 900° C. for 50 hours. Together, tests were conducted with regard to the same exhaust gas at a temperature of 900° C. at the inlet of the monolith honeycomb convertor. The result of measurements of NOx emission control efficiency is shown in FIG. 12.

As clearly understood, the result demonstrates that the catalyst produces a sharp decrease in NOx emission control efficiency when the amount of the over catalyst layer becomes smaller than 10% by weight of the monolith honeycomb carrier. This decrease is considered to result from the difficulty of forming a necessary thickness of a coating for the over catalyst layer due to the small amount. Further, the catalyst also produces a decrease in NOx emission control efficiency with an increase in the amount of the over catalyst layer. This decrease is considered to result from insufficient reaction of the palladium in the under catalyst layer when the amount of the under catalyst layer is large and, consequently, the combustion of hydrocarbons is caused at low temperatures. As seen in FIG. 12, the over catalyst layer of over 34% by weight of the monolith honeycomb carrier produces a decrease in HC emission control efficiency. From these facts it is proved that the range of weight proportions of the over catalyst layer relative to the total weight of the catalyst is between 8/40 and 34/40, and more desirably between 12/40 and 22/40.

Figure 13:
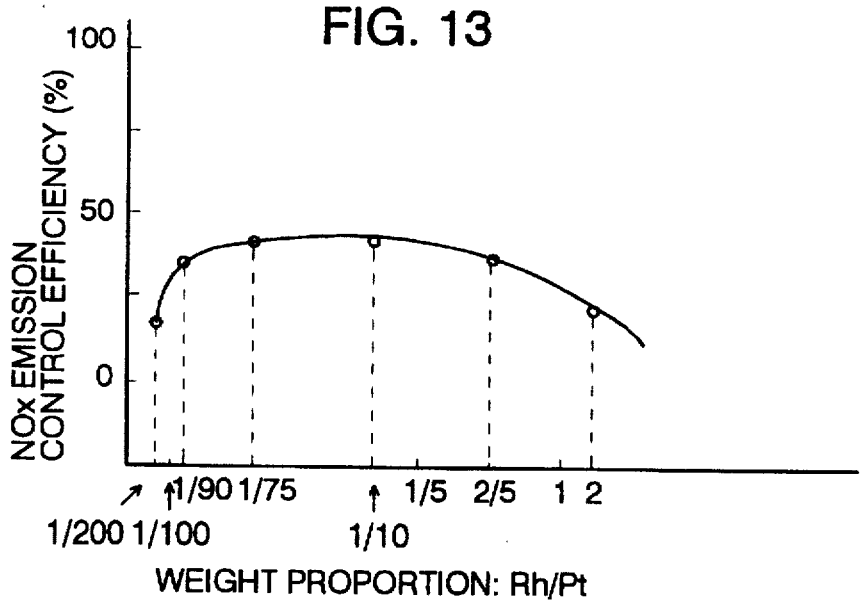
FIG. 13 is a graph showing the effect of weight proportions between platinum and rhodium in the over catalytic layer on NOx emission control efficiency.

In order to define appropriate weight proportions of the platinum and rhodium in the over catalyst layer, the effect of weight proportions between the platinum and rhodium (Rh) in the over catalyst layer on NOx emission control efficiency was investigated with regard to various sample catalysts. Each catalyst layer of the sample catalyst prepared was the same in construction as that used in the investigation to define the appropriate weight proportions of the over and under catalyst layers and had an amount of 20% by weight of the monolith honeycomb carrier. The amount of palladium in the under catalyst layer was 7 grams per one liter of the volume of the monolith honeycomb carrier, and the amount of the composition of platinum and rhodium in the under catalyst layer was 1.1 grams per one liter of the volume of the monolith honeycomb carrier. These sample catalysts were tested by being exposed to the same exhaust gas (A/F=22) as used in the evaluation of NOx emission control efficiency of the Examples I-IX after heat-aging treatment in the air at a temperature of 900° C. for 50 hours. The result of measurements of NOx emission control efficiency is shown in FIG. 13.

From the result, it can be said that, while even a slight amount of rhodium produces an effect of lowering the level of NOx emission, the catalyst is desirable to contain rhodium of a weight proportion greater than 1/90 relative to platinum. On the other hand, if the weight proportion of rhodium relative to platinum exceeds 2/5, the catalyst lowers its NOx emission control efficiency. This is considered to result from a decrease in the amount of platinum directly contributory to NOx emission control relative to an increased amount of rhodium and mutual reaction between the increased amount of rhodium in the over catalyst layer and the palladium in the under catalyst layer which produces aggravation of chemical characteristics. From the fact, it is proved that an appropriate range of weight proportions of the rhodium relative to the platinum is between 1/90 and 2/5.

Figure 14:
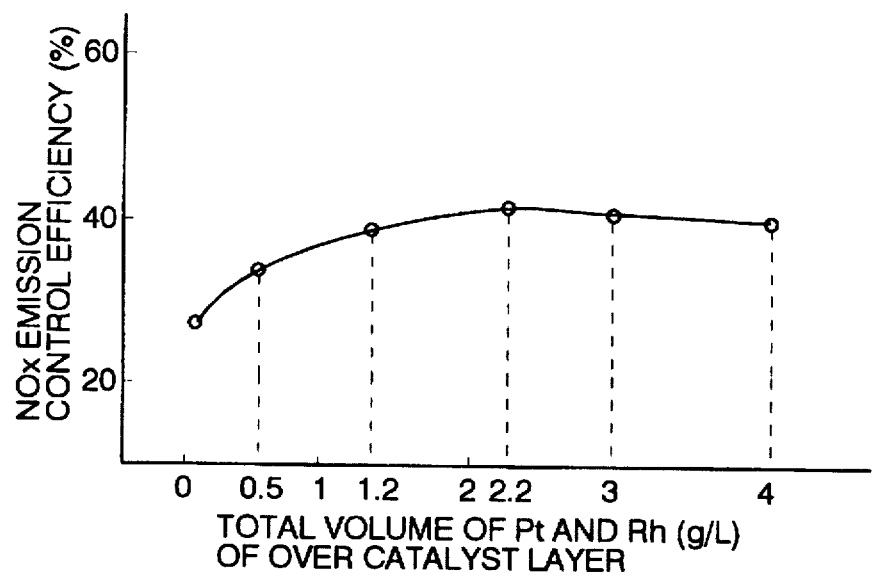
FIG. 14 is a graph showing the effect of the total amount of platinum and rhodium in the over catalytic layer on NOx emission control efficiency.

Further, in order to evaluate the effect of the total amount of platinum and rhodium in the over catalyst layer on NOx emission control efficiency, various sample catalysts were prepared. In this evaluation the sample catalyst used in the previous investigation was modified only in the total amount of the over and under catalyst layers. The amount of each catalyst layer of the sample catalyst was 20% by weight of the monolith honeycomb carrier. The amount of the palladium in the under catalyst layer was 7 grams per one liter of the volume of the monolith honeycomb carrier. These sample catalysts were tested by being exposed to the same exhaust gas (A/F=22) as used in the evaluation of NOx emission control efficiency of the Examples I-IX after heat-aging treatment in the air at a temperature of 900° C. for 50 hours. The result of measurements of NOx emission control efficiency is shown in FIG. 14.

As clearly understood from the result, while, with an increase in the total amount of platinum and rhodium in the over catalyst layer, the catalyst increases its NOx emission control efficiency, any significant increase in NOx emission control efficiency is not yielded if the total amount of platinum and rhodium is over 2 grams per one liter of the volume of the monolith honeycomb carrier. From this fact and the results of the previous investigation conducted to define the appropriate range of weight proportions of platinum and rhodium in the over catalyst layer, it is understood that the main factor greatly affecting the NOx emission control efficiency of the catalyst is not the amount of platinum but the weight proportion of platinum and rhodium. Accordingly, it is not always effective on NOx emission control efficiency of the catalyst to increase the total amount of platinum and rhodium. For instance, the total amount of platinum and rhodium over approximately 10 grams per one liter of the volume of the monolith honeycomb carrier causes sintering of the noble metals and rather lowers the heat-resistance of the catalyst.

Figure 15:
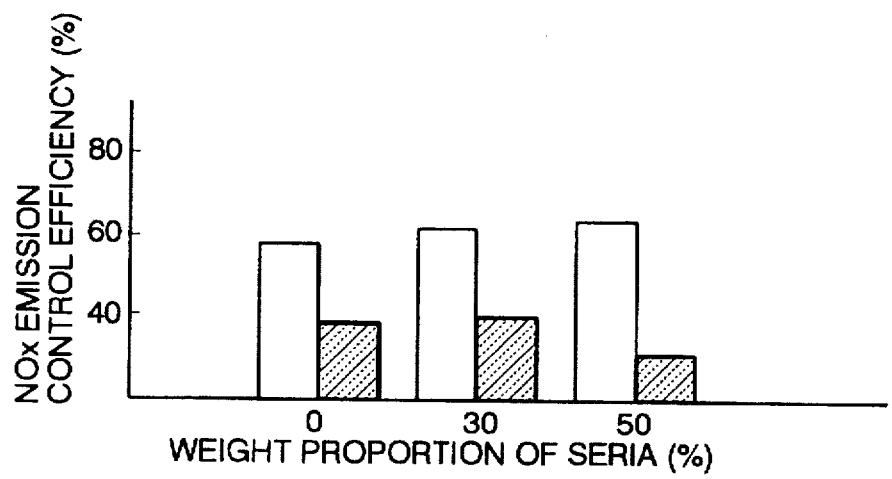
FIG. 15 is a graph showing the effect of the amount of a ceria additive in the over catalytic layer on NOx emission control efficiency.

In order to evaluate the effect of ceria as an additive in the over catalyst layer on NOx emission control efficiency, evaluation tests were conducted for various sample catalysts. Each sample catalyst had over and under catalyst layers of 20% by weight of the monolith honeycomb carrier and was modified only in the amount of ceria, and hence the total amount of palladium and rhodium in the over catalyst layer. These sample catalysts before and after heat-aging treatment were tested by being exposed to the same exhaust gas (A/F=22) as used in the evaluation of NOx emission control efficiency of the Examples I-IX. For the heat-aging treatment, the catalysts were exposed to a gas containing 100 ppm of a sulfur oxide ($SO_2$) and 10% of water ($H_2O$) and repeatedly heated and cooled between temperatures of 900° C. and 450° C. for 24 hours. The result of measurements of NOx emission control efficiency is shown in FIG. 15.

It is understood from the result that, as the amount of ceria increases, the catalyst demonstrates a tendency to produce an increase in NOx emission control efficiency while it is fresh and, however, to lower its NOx emission control efficiency after the heat-aging treatment. As was previously studied, since the ceria is added with the effect of improving the catalyst activity at high temperatures, the catalyst is desirable to contain the ceria of an amount in a range between 20 and 50% by weight per one liter of the volume of the monolith honeycomb carrier, in particular in a range between 20 and 35% by weight per one liter of the volume of the monolith honeycomb carrier in consideration of a decrease in the durability of catalyst. In other words, because the thermally weakest component in the catalyst is the ceria, an increase in the amount of the ceria causes deterioration in performance of the catalyst after the heat-aging treatment and, consequently, it is desirable to provide such a weight constraint imposed on the ceria component.

FIG. 16 shows the effect of the presence of a ceria additive on NOx emission control efficiency in relation to exhaust gases resulting from combustion of various air-fuel ratios of air-fuel mixtures. Tests were made by forcing various oxygen contents of exhaust gases to flow through fresh catalysts of a surface-volume ratio SV of 55,000 $h_{-1}$. As shown in FIG. 16, the catalyst containing the ceria of 30% by weight produces a significant improvement in NOx emission control efficiency in a range, in particular, between an air-fuel ratios of $\lambda=1$ and an air-fuel ratio at which the exhaust gas contains 2% of oxygen ($O_2$) as compared with the catalyst without a ceria additive.

It is effective to an improvement in NOx emission control efficiency to add alumina in place of the ceria, or otherwise to add alumina together with the ceria. Further, in order to improve the durability of the alumina and ceria components, it is effective to add zirconium, lanthanum and/or barium as additives. Adding such an additive prevents a decrease in specific surface area of the catalyst and, as a result, prevents a decrease in emission control efficiency of the catalyst.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A catalyst construction for purifying gas comprising:
   a catalyst carrier;
   an under catalyst layer coated on said catalyst carrier, said under catalyst layer comprising catalyst particles of palladium and alumina particles as a support for supporting said palladium particles; and
   an over catalyst layer coated on said under catalyst layer, said over catalyst layer comprising catalyst particles of platinum and rhodium and a crystalline metal silicate support for supporting said catalyst particles of platinum and rhodium.

2. A catalyst construction as defined in claim 1, wherein said over catalyst layer is coated directly on said under catalyst layer.

3. A catalyst construction as defined in claim 1, wherein at least said under catalyst layer comprises a cerium oxide.

4. A catalyst construction as defined in claim 1, wherein said over catalyst layer has a weight proportion relative to a total weight of said over catalyst layer and said under catalyst layer in a range between 8:40 and 34:40.

5. A catalyst construction as defined in claim 1, wherein said over catalyst layer comprises said rhodium of a weight proportion relative to said platinum in a range between 1:90 and 2:5.

6. A catalyst construction as defined in claim 1, wherein said over catalyst layer is added with alumina.

7. A catalyst construction as defined in claim 2, wherein said over catalyst layer has a weight proportion relative to a total weight of said over catalyst layer and said under catalyst layer in a range between 8:40 and 34:40.

8. A catalyst construction as defined in claim 2, wherein said over catalyst layer comprises said rhodium of a weight proportion relative to said platinum in a range between 1:90 and 2:5.

9. A catalyst construction as defined in claim 2, wherein said over catalyst layer is added with alumina.

10. A catalyst construction as defined in claim 3, wherein said over catalyst layer has a weight proportion relative to a total weight of said over catalyst layer and said under catalyst layer in a range between 8:40 and 34:40.

11. A catalyst construction for purifying automotive engine exhaust gas resulting from combustion of an air-fuel mixture leaner than a stoichiometric air-fuel mixture, said catalyst construction comprising:

a catalyst carrier;

an under catalyst layer coated on said catalyst carrier, said under catalyst layer comprising catalyst particles of palladium and alumina particles as a support for supporting said palladium particles; and an over catalyst layer coated on said under catalyst layer, said over catalyst layer comprising catalyst particles of platinum and rhodium and a crystalline metal silicate support for supporting said catalyst particles of platinum and rhodium.

12. A catalyst construction as defined in claim 11, wherein said over catalyst layer is coated directly on said under catalyst layer.

13. A catalyst construction as defined in claim 11, wherein said under catalyst layer comprises a cerium oxide.

14. A catalyst construction as defined in claim 11, wherein said over catalyst layer has a weight proportion relative to a total weight of said over catalyst layer and said under catalyst layer in a range between 8:40 and 34:40.

15. A catalyst construction as defined in claim 11, wherein said over catalyst layer comprises said rhodium of a weight proportion relative to said platinum in a range between 1:90 and 2:5.

16. A catalyst construction as defined in claim 11, wherein said over catalyst layer is added with alumina.

17. A catalyst construction for reducing nitrogen oxides (NOx) in an automotive engine exhaust gas resulting from combustion of an air-fuel mixture leaner than a stoichiometric air-fuel mixture to nitrogen ($N_2$), said catalyst construction comprising:

a catalyst carrier;

an under catalyst layer coated on said catalyst carrier, said under catalyst layer comprising catalyst particles of palladium and alumina particles as a support for supporting said palladium particles; and an over catalyst layer coated on said under catalyst layer, said over catalyst layer comprising catalyst particles of platinum and rhodium and a crystalline metal silicate support for supporting said catalyst particles of platinum and rhodium.

18. A catalyst construction as defined in claim 1, wherein said under catalyst layer comprises a cerium oxide.

19. A catalyst construction for purifying automotive engine exhaust gas containing hydrocarbons (HC), nitrogen oxides (NOx) and carbon monoxide (CO) resulting from combustion of an air-fuel mixture, said catalyst construction comprising:

a catalyst carrier;

an under catalyst layer coated on said catalyst carrier, said under catalyst layer comprising particles of palladium supported by silicate; and an over catalyst layer coated on said under catalyst layer, said over catalyst layer comprising catalyst particles of platinum and rhodium supported by silicate.

20. A catalyst construction as defined in claim 19, wherein said under catalyst layer comprises a cerium oxide.

* * * * *

UNITED STATES PATENT AND TRADEMARK OFFICE
CERTIFICATE OF CORRECTION

PATENT NO.: 5,795,840
DATED : August 18, 1998
INVENTOR(S): Akihide TAKAMI, et al.

It is certified that error appears in the above-identified patent and that said Letters Patent is hereby corrected as shown below:

Title Page, [56] References Cited, FOREIGN PATENT DOCUMENTS ADD --7-108172 4/1995 Japan--.

Column 9, line 58, change "VII" to --VIII--.

Signed and Sealed this

Twenty-fifth Day of May, 1999

Attest:

Q. TODD DICKINSON

*Attesting Officer*   *Acting Commissioner of Patents and Trademarks*